United States Patent [19]
Beiswenger et al.

[11] Patent Number: 5,487,053
[45] Date of Patent: Jan. 23, 1996

[54] DIGITAL CLOCK

[75] Inventors: John L. Beiswenger, Strasburg, Pa.;
Robert I. Schwimmer, Glendoe, Ill.

[73] Assignee: Technomarket, L.P., Chicago, Ill.

[21] Appl. No.: 279,524

[22] Filed: Jul. 25, 1994

Related U.S. Application Data

[62] Division of Ser. No. 98,464, Jul. 28, 1993, Pat. No. 5,381,388.

[51] Int. Cl.[6] .......................... G04C 17/00; G04C 19/00; G09G 5/00
[52] U.S. Cl. .............................. 368/69; 368/73; 368/239; 345/34; 345/173
[58] Field of Search ........................... 368/69, 70, 82–84, 368/185, 187, 239–242; 340/706, 711, 712; 345/33, 34, 173–175

[56] References Cited

U.S. PATENT DOCUMENTS

| | | |
|---|---|---|
| 4,047,010 | 9/1977 | Perotto et al. . |
| 4,139,837 | 2/1979 | Liljenwall et al. . |
| 4,149,257 | 4/1979 | Nakagiri et al. ........................... 360/10 |
| 4,322,833 | 3/1982 | Husted . |
| 4,387,367 | 6/1983 | Fisher . |
| 4,538,924 | 9/1985 | Nakata . |
| 4,785,432 | 11/1988 | Havel . |
| 4,847,606 | 7/1989 | Beiswenger . |
| 4,910,504 | 3/1990 | Eriksson . |
| 4,958,911 | 9/1990 | Beiswenger et al. . |

FOREIGN PATENT DOCUMENTS 55-107984  8/1980  Japan .

*Primary Examiner*—Vit W. Miska
*Attorney, Agent, or Firm*—Gerstman, Ellis & McMillin, Ltd.

[57] ABSTRACT

A digital clock comprises an electronic timekeeping circuit, plus an electronic digital display connected to the timekeeping circuit to display time as controlled by the circuit. An electronic control is provided to permit changing of individual numerals displayed in a plurality of locations by manually pointing at the individual numerals. The electronic control may comprise a transparent, touch-sensitive detector, positioned in front of the digital display to permit manual changing of the individual numerals.

20 Claims, 5 Drawing Sheets

DIGITAL CLOCK

CROSS REFERENCE TO RELATED APPLICATION

This is a division of application Ser. No. 08/098,464 filed Jul. 28, 1993 and entitled Digital Clock, now U.S. Pat. No. 5,381,388.

BACKGROUND OF THE INVENTION

Electronic digital clocks have become extremely common, being found as bedside-table alarm clocks, clock radios, clocks for automobiles, wrist watches and the like. Such clocks of course display the time in digital form rather than using hands, and can be very inexpensive yet reliable. Electronic digital clock assemblies are also incorporated in VCRs, microwave ovens and many other consumer and commercial products.

However, as one drawback to digital clocks, frequently it is by no means clear and readily understandable how to use the controls to set the clocks to the time of day, or to set the alarm time, when that is desired, and the like. Also, many digital clocks operate on a twenty-four hour basis, while they display the conventional AM and PM time mode. People get confused upon setting the clocks so that an alarm may be set for a certain time in the PM when it was actually desired to set the clock for AM.

Also, in the prior art digital clocks it is sometimes necessary to hold down one button while pressing another and then to observe the changes, releasing one or both when the correct numeral is displayed. This hand-to-eye coordination is difficult and intimidating to many users. Also, if the minutes numeral desired is accidentally passed by one numeral, it becomes necessary to scroll through 58 numerals to return to the correct numeral.

In accordance with this invention, a digital clock is provided in which a great simplification of control is available, to minimize confusion by the user. Thus, less of a learning curve is required for changing the time and setting the alarm of such digital clocks, and their use is made easier.

DESCRIPTION OF THE INVENTION

By this invention, a digital clock is provided which comprises an electronic timekeeping circuit, an electronic digital display means connected to the time keeping circuit to display time as controlled by the circuit, and electronic control means.

The electronic control means permits the changing of individual numerals displayed by the display means by manually pointing to the individual numerals to be changed. Thus, if one wishes to change the time 8:00 o'clock to 9:00 o'clock, one needs to simply touch the numeral eight at its location in the plurality of numeral locations shown, thus causing the "8" to turn to a "9". In many embodiments a simple touch of any of the numerals will cause the numeral to advance by one. A second touch will cause a second advancement by one in any of the numerals. Thus, by this means, the digital clock of this invention is easily controllable.

The electronic control means that accomplishes this may comprise light beam emission means, light beam sensing means, and means for passing individual light beams from the emission means to the sensing means in front of the numerals in a position to permit selective blocking of the individual light beams with a finger. Thus, in this embodiment one does not have to even touch the electronic digital display means, but merely to closely point at it in order to block the light beam, to create a signal that causes advancement of the particular numeral being pointed at. Thus, typically, it is preferred for the digital clocks of this invention, and their numerals, to be of a size to permit convenient manual pointing at any of the numerals displayed with the finger in a manner to select one numeral location over another.

The light beam emission means may comprise a plurality of LEDs for forming a plurality of spaced beams respectively crossing the locations of the numerals. Alternatively, the light beam emission means may comprise a single light source, plus means for producing the individual light beams, plus means for selectively time-gating the light beams. This may be accomplished in a manner described by Beiswenger U.S. Pat. No. 4,847,606, the disclosures of which are incorporated by reference herein.

The electronic digital display means may comprise LED displays, LCDs, vacuum fluorescent displays, electroluminesent displays, and the like. The electronic control means may include software, firmware arrangements such as electronic circuits, or components that do not require software or firmware, even, if desired electromechanical relay circuitry. The electronic control means may also, as above, optically sense the position of a user's finger that is manually pointing at an individual numeral, but it may alternatively sense the pressure of the finger pressing against transparent switch means positioned in front of the digital display means, to permit manual changing of the individual numerals displayed. Alternatively, the presence of the user's finger, or in any alternative case a probe rather than the finger, may be sensed through capacitive coupling, sound waves, resistive techniques, or any other desired means to permit control of the clock by manual pointing with the finger, a pencil or other probe at the individual numerals.

The digital clock of this invention may carry clock alarm means of a generally conventional type, plus means for setting the alarm means by the direct changing of individual numerals displayed by pointing at the numerals.

Also, the electronic control means may permit control of the digital clock functions by manually pointing to locations on the clock which are other than the locations of the numeral display means ("command boxes").

Also by this invention, the digital display means may be capable of displaying digits in a first color to indicate time in the AM, and in a second color to indicate time in the PM. This can be accomplished, for example, by a back lit color liquid crystal display, or by other desired means. Thus, confusion can be eliminated as the user sets the clock, since the AM and PM distinction is prominently displayed.

DESCRIPTION OF SPECIFIC EMBODIMENTS

Figure 1:
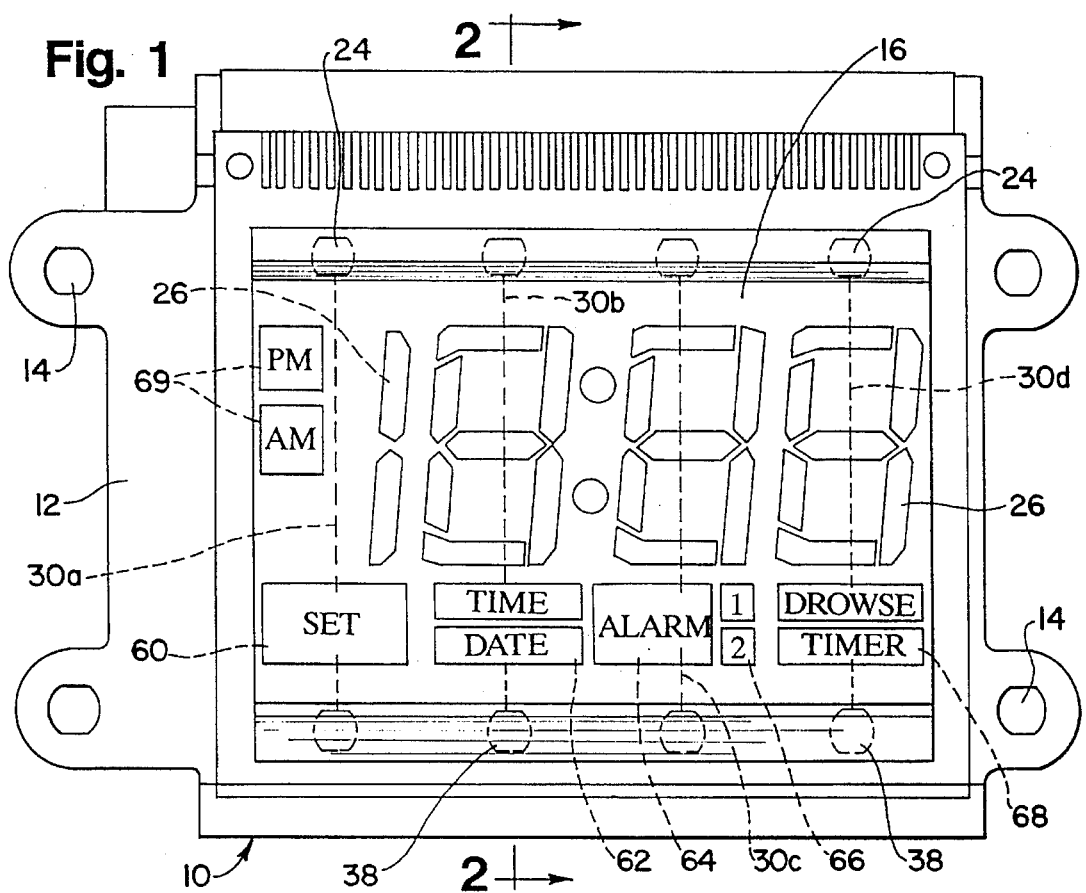
FIG. 1 is an elevational view of a digital alarm clock in accordance with this invention, in which the display means utilizes a liquid crystal display plus an optically switched electronic control means, with a front portion removed for clarity.
Figure 2:
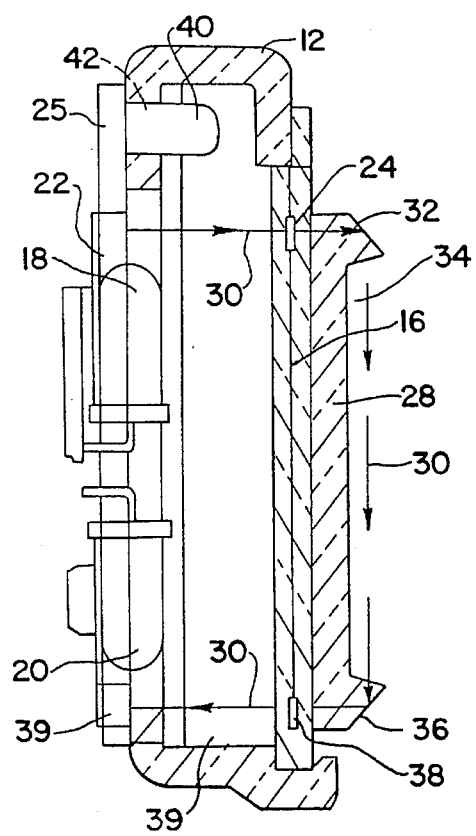
FIG. 2 is a sectional view taken along line 2—2 of FIG. 1.
Figure 3:
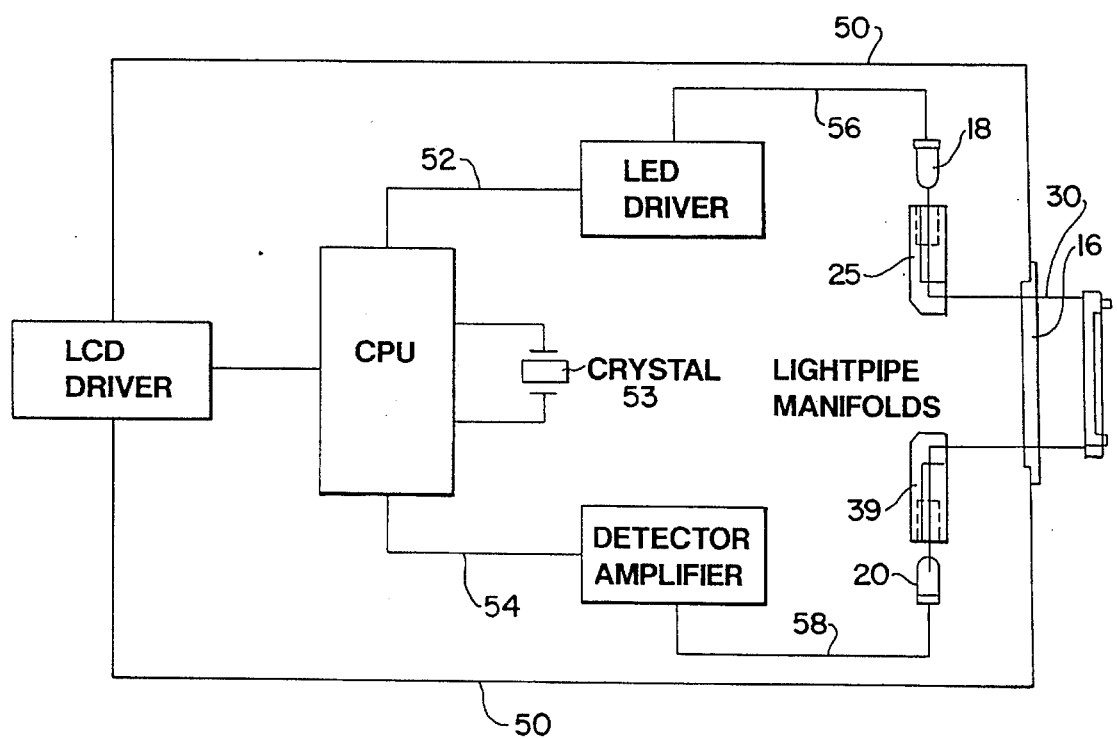
FIG. 3 is a block diagram showing the operation of the digital clock of FIG. 1.

Referring to FIGS. 1-3, a digital alarm clock 10 is disclosed, without its outer casing, which outer casing may be of any desired design. Within frame 12 having optional apertures 14 for attachment to an outer casing, a liquid crystal display panel (LCD) 16 is provided, being retained within frame 12.

A single light emitting diode (LED) 18 may be provided for emitting visible, infrared or ultraviolet light beams that are sensed by a single diode or phototransistor 20. Light emitted by LED 18 is directed through edge portions 22 of frame 12, which is made of a clear plastic and shaped so that the frame acts as a light pipe 25, splitting and delivering light respectively to a series of gating "window" areas (LCD time-gates) 24 which are defined in LCD 16, to either permit the passage of or to block light beams in accordance with the electronic program of the system.

By this means, the optical switching system that is used to control the various individual numerals 26 defined on LCD 16 may be similar to the disclosures of the previously cited U.S. Patent incorporated by reference herein.

A prismatic, transparent second frame 28 is carried in front of LCD 16 (shown only in FIG. 2) so that light beam 30 passing through an "open" LCD time-gate bounces off of first reflective surface 32 to pass through the space 34 enclosed by frame 28 across the face of LCD 16. Then, light beam 30 strikes second angled, reflective surface 36, and from there is directed through a second LCD time-gate 38 defined in LCD 16, from there traveling through a second light pipe portion 39 of frame 12 to photodetector 20.

As in the previously cited patent, four LCD time-gates 24 and four LCD time-gates 38 are provided, with each of a set of gates 24, 38 being provided for a separate beam of light, so that four separate beams of light 30a, 30b, 30c, 30d (FIG. 1) are provided. The respective gates 24, 38 are controlled so that the beams are sequentially present as single beams, with the time of the existence of each individual beam being electronically predetermined, each beam being created for only a few thousands of a second, and the overall cycle of the sequential creation and termination of the beams being only a fraction of a second. Since the time of existence of each beam is electronically noted, when the user places a finger or pencil very near one of the numerals 26, the absence of the light beam, blocked by the finger, is electronically noted and identified as occluding one of the four beams 30a–d. Thus, as described in the previous patent, a predetermined switching function takes place, characteristic of the particular light beam which has been occluded, with the four switch-controlling light beams 30a–d being created and sensed all by a single LED 18 and a single photodetector 20.

Incandescent light 40 is present to supply back lighting for the LCD 16. If desired, a plurality of electronically controlled back lights 40 of different colors may be provided, to provide a multicolored LCD display in accordance with the principles of U.S. Pat. No. 4,958,911, the disclosures of which are incorporated by reference herein. By such a multicolor display of lights 40, 42, it becomes possible for numerals 26 to be displayed in differing colors so that AM times may be displayed in, for example, green, while PM times may be displayed for example in red. Thus, the user is protected from confusion.

FIG. 3 shows a block diagram of the clock system. The LCD driver as shown is connected to the liquid crystal display 16 by wires 50. The LCD driver is also connected to the CPU or electronic control means, which, in turn, is connected to the clock crystal 53. The CPU is also connected respectively by wires 52, 54 to an LED driver and a detector amplifier. The LED driver connects by wire 56 to LED 18, while the detector amplifier connects by wire 58 to photodiode 20.

Figure 4:
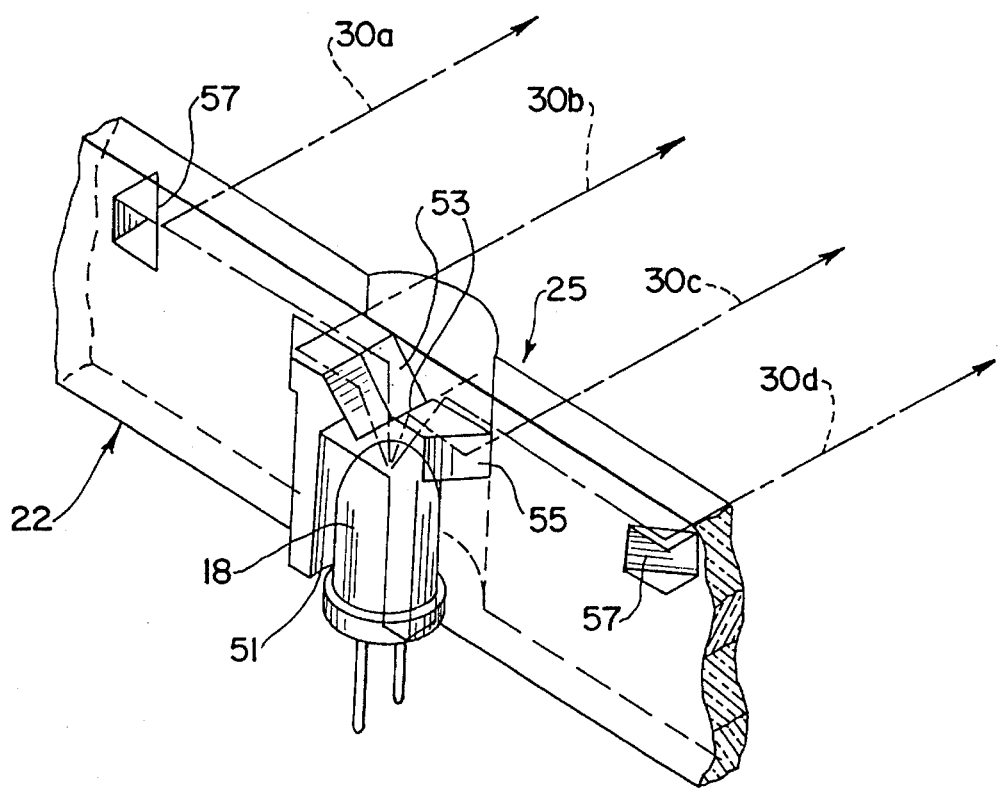
FIG. 4 is a fragmentary, perspective view of a portion of the clock frame.
Figure 5:
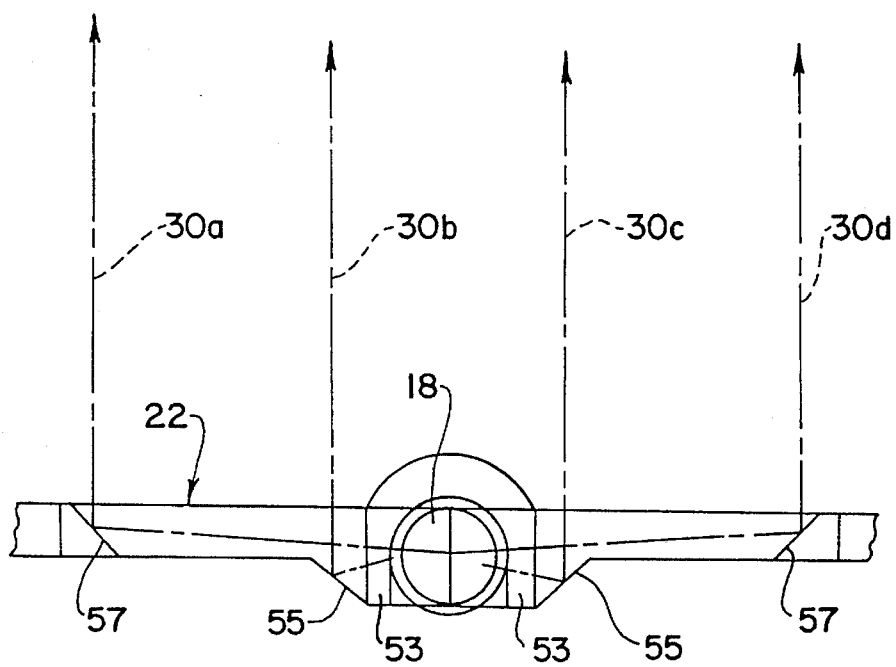
FIG. 5 is a fragmentary plan view of the same frame portion as shown in FIG. 4.

By light pipe manifold 25 a plurality of light beams 30 are provided, with manifold 25 extending transversely of the beams and reflecting by an angled surface or surfaces the light beam along its various paths 30a–d. Similarly, the respective light beams are picked up by a second light pipe manifold 39, and by similar surfaces are all directed to photodiode 20. A specific example of such a light pipe is shown in Beiswenger U.S. application Ser. No. 726,270, filed Jul. 5, 1991, now abandoned. This is accomplished as illustrated in FIGS. 4 and 5 where a portion of the frame 22 is disclosed which comprises respectively the structure of light pipe manifold 25. Second light pipe manifold 39 may be of similar design. Light emitting diode may be placed within a recess 51 of frame 22. A V-shaped notch 53 in frame 22 is provided above LED 18, to reflect light beams at an angle transverse to their angle of incidence from LED 18, in opposed directions, with the light beams passing through the transparent material of frame 22.

Then, light moving in opposed directions encounters a first pair of angled surfaces 55 which causes reflection and creation of the separate beams 30b, 30c.

Also, frame 22 defines a second pair of angled surfaces 57 which are spaced on opposed sides of LED 18 and farther from the LED than angled surfaces 55. Also, the centers of angled surfaces 57 occupy a plane which is parallel to but different from the centers of angled surfaces 55 as can be best inferred from FIG. 5. Thus, light from LED 18 is received by surfaces 55, but angled surfaces 57 also receive light in an unobstructed manner from LED 18 because they are out of the plane of angled surfaces 55, to create light beams 30a, 30d as shown.

Thus, a portion of frame 22 serves as a light pipe to provide, in this embodiment, four parallel beams of light 30 from a single light source 18, making use of a wedge shaped reflective surface 53 to form two light beams in opposite directions, followed by the various angled surfaces 55, 57 which interact with each light beam to form the desired four light beams 30a–30c. It can be seen that the respective reflective surfaces 53, 55, 57 are formed at interfaces between the transparent material of frame 22 and the exterior to form a plastic-air reflective interface. Also, if desired, a reflective coating may be placed on the respective surfaces 53, 55, 57. Particularly, reflective surfaces 53 and 57 may be formed as recesses in the frame 22. Reflective surfaces 55 are formed as part of an outwardly extending projection of frame 22, as particularly shown in FIG. 5.

The respective light beams 30a, 30d may then be collected by light pipe manifold 39 which may be of essentially identical structure to that of FIGS. 4 and 5 but working in reverse, with detector 20 occupying the position shown for LED 18 in FIGS. 4 and 5.

For the operation of the clock of FIGS. 1–3, the following functions are available. Liquid crystal display 16 not only has four numeral forming areas 26 for the display of the time, as shown, but LCD 16 also has other display areas.

To set the time on the energized device, the numerals 26 initially blink and display preferably 0:00. The user can then point to the displayed command box area 60 entitled "SET". Upon pointing to that area, light beam 30a is interrupted. The signal thus received causes the CPU to light the area 60 to indicate receipt of the signal and to set the system to receive a further signal.

One then can point to the time/date area 62, thus interrupting light beam 30b, which activates the CPU to light up the "time" portion of area 62 to indicate receipt of the choice, then permitting the respective numerals 26 to be adjusted by a touch. Thus, each of the numeral areas 26 may be so adjusted, except that the leftmost area 26, which is uniquely in the shape of a "1", is linked to the adjacent area and, in this embodiment, not touch sensitive. Thus, area 26 which is second from the left may be sequentially touched to display the respective hour numerals 1 through 12 by occlusion of light beam 30b. The right hand two areas 26 may be sequentially linked, or individually capable to each display the respective ten numerals 1 through 0, by occlusion of the respective light beams 30c and 30d.

After the numerals have been properly set by finger touch of the respective numeral areas 26, one may point again to "SET" area 60, occluding light beam 30a to terminate the process with the desired time remaining set ("locked-in", so to speak), and the correct time being kept by the device.

Touching of a numeral occludes one of light beams 30b, 30c and 30d. As stated, the occluding of light beam 30a will not adjust the numerals since light beam 30b adjusts the left two numerals from 1–12. Light beam 30a thus becomes a control beam for the "SET" control 60.

To set the alarm in the clock of FIGS. 1–3, the first step is once again to touch or point at the "SET" control 60, thus occluding light beam 30a. The area 60 lights up, following which one touches or points at the "ALARM" area 64 to occlude light beam 30c. This of course sends a different signal to the CPU, which causes area 64 to light up, indicating receipt of the command. The alarm time is then displayed. One can then advance the numerals 26 by touching to the correct time as before. One then points again to the "SET" area 60 to set the alarm at the desired time, following which the clock shows the proper time and not the alarm set time.

To deactivate the alarm, one can touch alarm control 64 again.

It can be noted that the two areas numbered "1" and "2" (referred to by reference numeral 66) are present to permit the setting of two separate alarms. The second alarm can be set sequentially by the same technique as the setting of the first alarm, and then both alarms will subsequently go off, being separately shut off by touching of the alarm control. Thus, two people can be wakened at different alarm times.

To set a snooze (or "drowse") delay, one points to the set area 60 as before. Then, one points to the "DROWSE" section 68 to occlude light beam 30d, which causes section 68 to light up. The numerals 26 spontaneously display :00 (unless previously set to a different number). Then, one can advance the degree of desired drowse time wanted, say ten or fifteen minutes, following which one points to the "SET" area 60 again, following which the clock goes back to the time of day again. To activate the alarm, one can point to the alarm area 64 within the preferred embodiment both areas 64 and 68 lighting up.

The drowse alarm 68 and the regular alarm 64 may then be terminated by touching anywhere on the face of the clock that occludes beams 30a, 30b, 30c, or 30d when they go off.

To set the date with this clock, one points first to the time/date area 62 to occlude light beam 30b, and then one points to the "SET" area 60 to occlude beam 30a. The "SET" area 60 and the "DATE" area of section 62 both light up. One can then point to the respective numerals 26 to change the numerals to the month and date as desired. One then points to "SET" area 60 again, and the time of day once again is displayed. The date can then be displayed simply by pointing at the time/date area 62, while a second pointing at the same area causes it to revert back to the time mode.

The above can all be accomplished by a conventional program in the CPU of a type readily understandable by those skilled in the art.

The AM/PM box areas 69 on liquid crystal display 16 may monitor the mode of the time, whether it is AM or PM for purposes particularly of setting the time of day and the alarm. The previously discussed change of color of the display can be either a substitute or in addition to area 69, or area 69 can change color.

Figure 6:
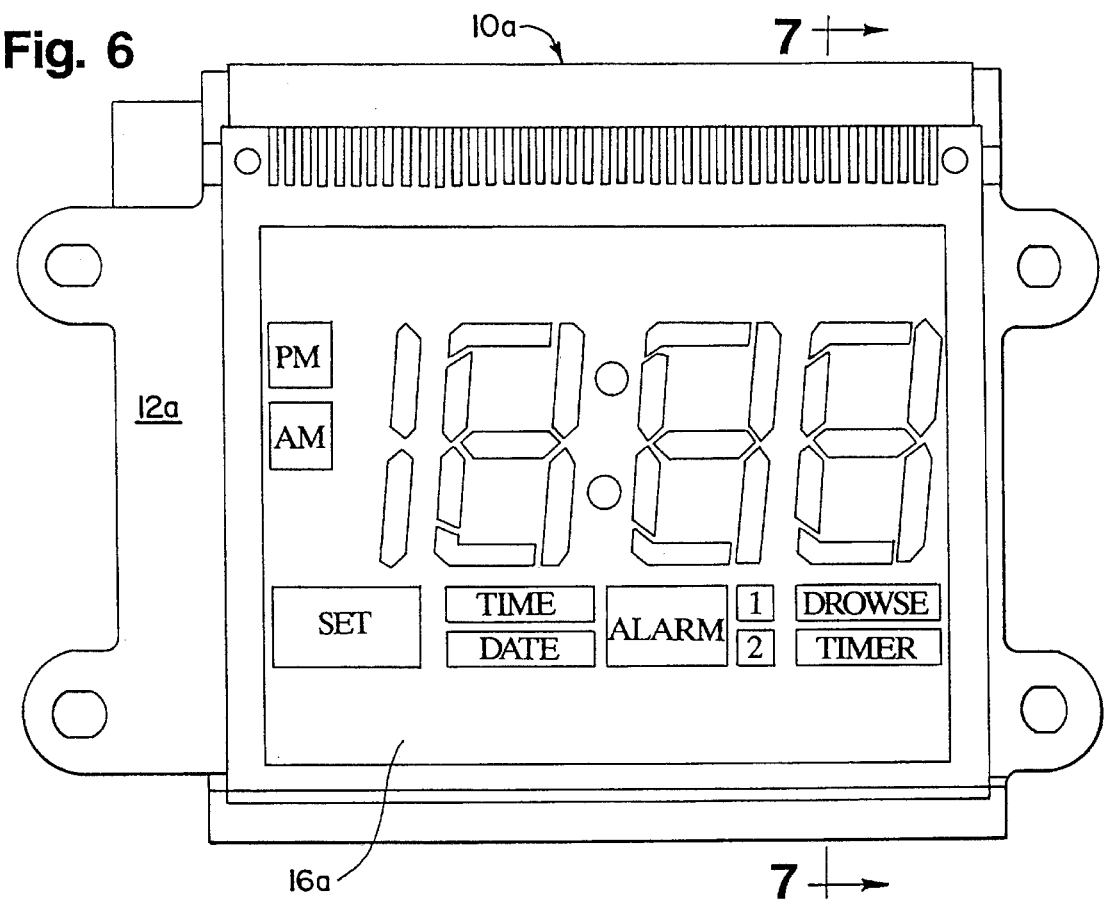
FIG. 6 is an elevational view of a digital alarm clock in which the electronic digital display means utilizes a liquid crystal display, but the electronic control means is non-optical.
Figure 7:
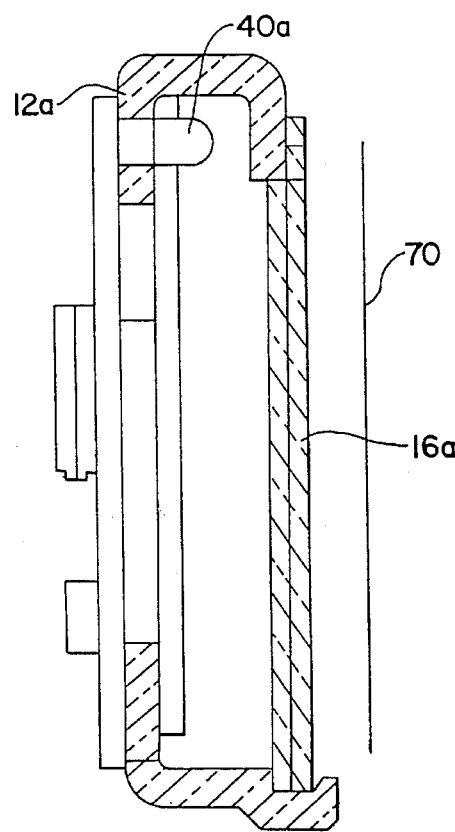
FIG. 7 is a sectional view taken along line 7—7 of FIG. 6.

Referring to FIGS. 6 and 7, an alarm clock 10a of similar structure and function to the above embodiment is provided, except as otherwise described herein. The clock has a liquid crystal display 16a, an incandescent back light 40a for the liquid crystal display, and a similar layout on the face of LCD 16a. However, in this case, switching is provided by a conventional transparent membrane switch array 70, which detects the position of the finger with pressure as placed on the surface of the LCD, to provide a switching function that is in many ways equivalent to the switching function of the previous embodiment, but by a different means. Thus, the touch display digital alarm clock 10a may be used as a substitute for digital clock 10 in the system of FIGS. 1–3. In this alternate embodiment, frame 12a may be opaque since it is not used as a light pipe.

Such transparent membrane switch arrays 70 are commercially available, for example from Transparent Devices Inc. of Newbury Park, Calif., and may be used in combination with liquid crystal displays of either the monochromatic or the color type. Likewise, the touch screen 70 may be used with plasma displays, electroluminescent displays, vacuum fluorescent displays, or the like for a wide variety of interactive terminal uses. Basically, membrane switch array 70 may replace the optical system disclosed above in essentially any desired use or environment.

Membrane switch array 70 may be replaced by a touch sensitive, capacitive-coupled panel or by touch sensitive, acoustic type panel.

Figure 8:
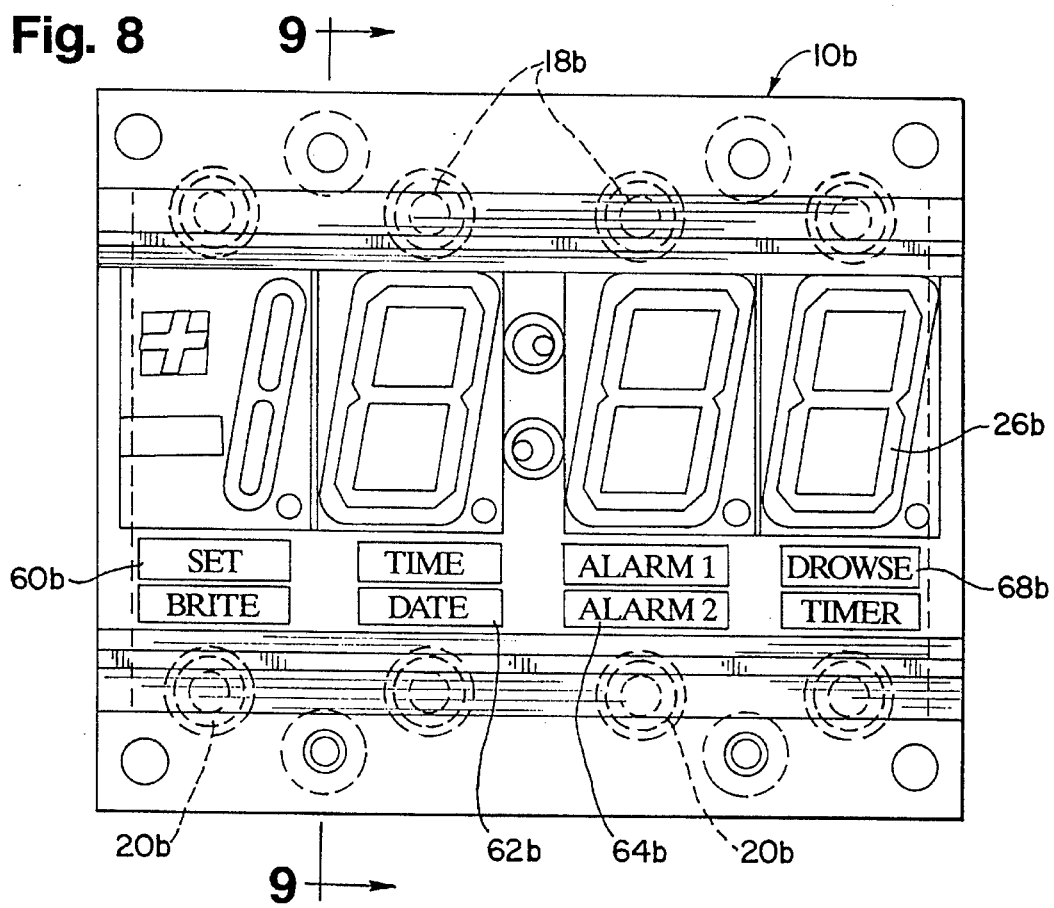
FIG. 8 is an elevational view of a digital alarm clock in accordance with this invention utilizing LED—emitted light beams and a plurality of discrete, separate photo receptors, to provide electronic control means with an optical switching function.
Figure 9:
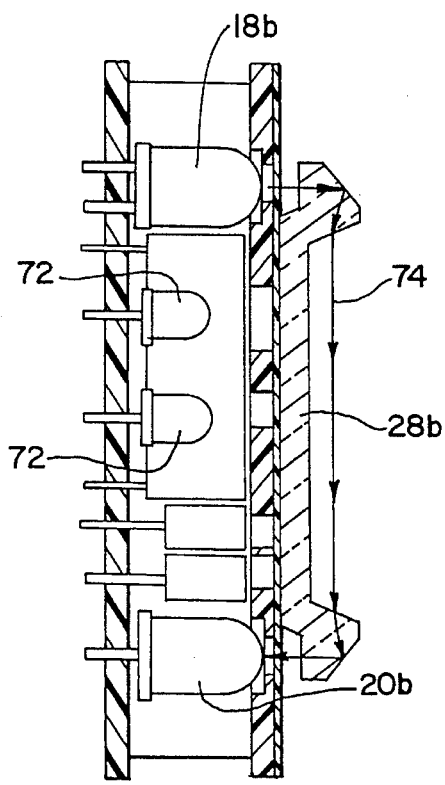
FIG. 9 is a sectional view taken along lines 9—9 of FIG. 8.

Referring to FIGS. 8 and 9, a touch display digital alarm clock 10b is disclosed in which the numerals 26b are formed by a segmented LED display. Similarly, the respective command areas 60b, 62b, 64b and 68b may be backlit by discrete LEDs and the clock color dots may be backlit by LEDs 72, to form a face of the clock similar to that of the previous embodiments.

In this embodiment, a plurality of light emitting diodes 18b are provided, each to provide a single, separate light beam 74 which communicates with one of a plurality of photoreceptors 20b. Alternatively, the same light emitting scheme as shown in FIGS. 1 and 2 may be used with the plurality of photoreceptors 20b, or a single photoreceptor 20b may be used with a light pipe manifold and a plurality of diodes 18b.

Since each light beam 30b is sensed by a separate photoreceptor 20b in this embodiment, it is a matter of conventional circuitry to communicate the separate photoreceptor signals to the CPU, to provide a scheme of operation that is similar in clock 10b to those of the previous embodiments. Frame 28b directs the light beams 74 as in the embodiment of FIGS. 1–3.

In other embodiments, the electronic control means may sense the presence of the user's finger or probe through capacitive coupling or by means of sound waves.

Additionally, in embodiments which use light beams, the geometry of the optics may be such that the ambient lighting does not effect the ability of the apparatus to sense the user's finger or probe. This may be accomplished either by shielding of the light beam path, or by the use of a different wavelength of light such as UV or infrared.

Also, in the situation where a backlit liquid crystal display is used, the electronic control means circuitry may include a frequency-band-pass-filter to filter out the backlighting frequency so that light emitted by the backlighting means does not interfere with the optical sensing of the user's finger or probe.

The electronic circuit which keeps time may include components which are mounted on a three dimensional (3D) printed circuit of essentially C-shaped cross section. The liquid crystal display is linked to the electronic circuit by means of flexible circuit and/or mounted directly to the 3D printed circuit, so as to display the time and electronic control areas positioned in front of the clock numerals as described above. Such a circuit structure is disclosed in the previously cited U.S. Pat. No. 4,958,911.

In the embodiment of FIGS. 1 and 2, the time-gates, or shutters or window areas 24, 38 on the liquid crystal display may be typically opened and closed sequentially and in a co-aligned but also in cross-aligned fashion, thus scanning the vertical and horizontal surface of the display for any occlusion, which is thus sensed by the electronic control means.

The above has been offered for illustrative purposes only, and is not intended to limit the scope of the invention, which is as defined in the claims below.

That which is claimed is:

1. A digital clock which comprises an electronic timekeeping circuit, an electronic digital display connected to said timekeeping circuit to display time as controlled by said circuit, and an electronic control to cause changing of individual numerals displayed by said display in a plurality of locations by manually pointing at said individual numerals, said electronic control comprising a transparent touch-sensitive detector positioned in front of said digital display to permit the electronic control to determine touch location.

2. The digital clock of claim 1 in which said digital display is capable of displaying time indicia in a first color to indicate AM time and in a second color to indicate PM time.

3. The digital clock of claim 1 which carries a clock alarm and circuitry for setting said clock alarm by manually pointing to individual numerals displayed.

4. The digital clock of claim 1 in which said electronic control permits control of digital clock functions by manual pointing at locations on said clock other than said plurality of display locations.

5. The digital clock of claim 1 in which said digital display comprises a liquid crystal display.

6. The digital clock of claim 5 in which said digital display comprises a backlit liquid crystal display.

7. The digital clock of claim 1 in which said digital display comprises an LED display.

8. A digital clock which comprises an electronic timekeeping circuit, an electronic digital display connected to said timekeeping circuit to display time as controlled by said circuit, and an electronic control to cause changing of individual numerals displayed by said display in a plurality of locations by manually pointing at said individual numerals, said electronic control comprising a transparent, touch-sensitive detector positioned in front of said digital display to permit the electronic control to determine touch location, said clock carrying a clock alarm plus circuitry for setting said clock alarm by manually pointing to individual numerals displayed, said electronic control also permitting control of digital clock functions by manual pointing at locations on said clock other than said plurality of display locations.

9. The digital clock of claim 8 in which said digital display is capable of displaying time indicia in a first color to indicate AM time and in a second color to indicate PM time.

10. The digital clock of claim 8 in which said digital display comprises a liquid crystal display.

11. The digital clock of claim 10 in which said digital display comprises a backlit liquid crystal display.

12. The digital clock of claim 8 in which said digital display comprises an LED display.

13. A digital clock which comprises an electronic time keeping circuit, an electronic digital display connected to said time keeping circuit to display time as controlled by said circuit, and an electronic control to cause the changing to different numerals of individual numerals displayed by said display in a plurality of locations, when the user manually points at said individual numerals while the digital clock electronic control is in a numeral-changing mode of operation, said electronic control also having a normal, time-displaying mode of operation when pointing at the numerals does not cause them to change.

14. The digital clock of claim 13 in which said digital display is capable of displaying time indicia in a first color to indicate AM time and in a second color to indicate PM time.

15. The digital clock of claim 13 which carries a clock alarm and circuitry for setting said clock alarm by manually pointing at individual numbers displayed.

16. The digital clock of claim 15 in which said electronic control permits control of digital clock functions by manual pointing at locations on said electronic digital display other than said plurality of display locations which carry the numerals.

17. The digital clock of claim 16 in which said digital display comprises a backlit liquid crystal display.

18. The digital clock of claim 16 in which said digital display comprises an LED display.

19. The digital clock of claim 13 in which said electronic control comprises at least one light beam emitter, at least one light beam sensor, and means for passing at least one light beam from the emitter to the sensor in front of said numerals in a position to permit selective occlusion of at least one light beam by manual pointing, the occlusion being detectable by the electronic control.

20. The digital clock of claim 13 in which said electronic control comprises a transparent, touch sensitive detector positioned in front of said digital display to permit the electronic control to determine touch location.

* * * * *